J. H. HASTE.
FILM SPOOL FOR CAMERAS.
APPLICATION FILED JUNE 22, 1907.
907,796.
Patented Dec. 29, 1908.
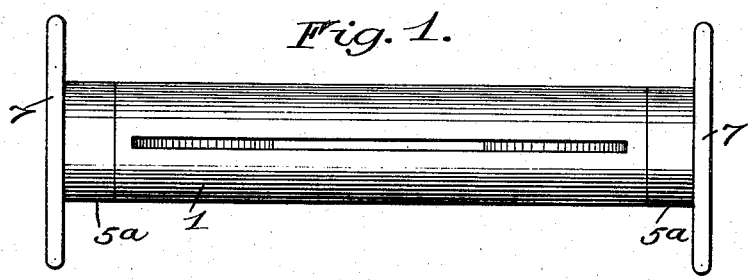
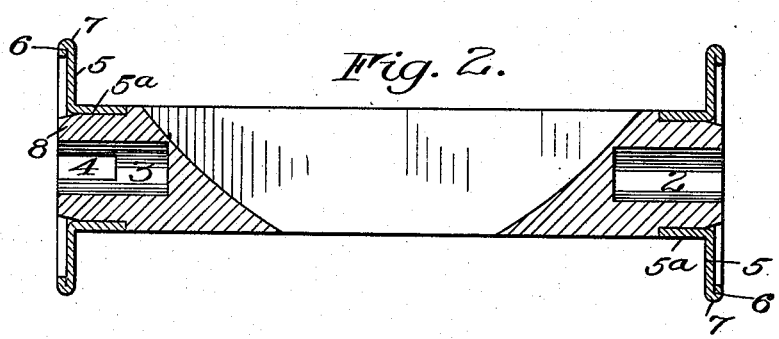
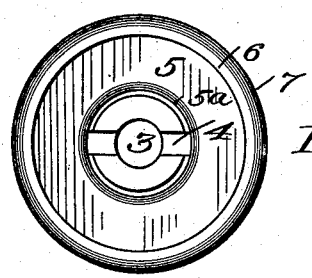

UNITED STATES PATENT OFFICE.

JAMES H. HASTE, OF ROCHESTER, NEW YORK, ASSIGNOR TO EASTMAN KODAK COMPANY, OF ROCHESTER, NEW YORK, A CORPORATION OF NEW YORK.

FILM-SPOOL FOR CAMERAS.

No. 907,796.      Specification of Letters Patent.      Patented Dec. 29, 1908.

Application filed June 22, 1907. Serial No. 380,218.

*To all whom it may concern:*

Be it known that I, JAMES H. HASTE, of Rochester, in the county of Monroe and State of New York, have invented certain new and useful Improvements in Film-Spools for Cameras; and I do hereby declare the following to be a full, clear, and exact description of the same, reference being had to the accompanying drawings, forming a part of the specification, and to the reference-numerals marked thereon.

This invention relates to spools for camera films and particularly to the type having sheet metal flanges.

In certain types of film cameras the use of film spools with sheet metal flanges has heretofore been impossible, owing to the fact that the sharp edge of the sheet metal cuts the side of the spool holder; and this invention has for its object to construct a sheet metal flanged film spool in such a manner that the spool holder of these cameras or any camera will not be injured by the flanges.

To these and other ends the invention consists in certain improvements and combinations of parts all as will be hereinafter more fully described, the novel features being pointed out in the claim at the end of the specification.

In the drawings: Figure 1 is a side view of a spool constructed in accordance with this invention. Fig. 2 is a longitudinal section; and Fig. 3 is an end view.

In the present embodiment of my invention, there is employed a drum 1 preferably made of wood and having a longitudinal slit serving as a means to secure one end of a film. At one end of the drum is preferably arranged a cylindrical bore 2 and at the other end a bore 3 with lateral outlets 4 is provided; the wall of the former bore serving as a bearing for the usual centering stud, and the other bore receiving the usual driving stud.

Sheet metal flanges 5 are connected to the ends of the drum preferably by a central open ended sleeve 5$^a$ on each resting in an annular depression or groove on one end of the drum, so that the peripheries of the drum and of the sleeve are flush with each other. Each flange is turned outwardly back upon itself, as at 6, by spinning or a like process, to provide a curved edge 7 which by its engagement with the sides of the spool holder will not injure the same. By turning the flanges outwardly, instead of inwardly, the flanges are provided with plane or smooth inner surfaces which will not interfere with the winding and unwinding of the film. Owing to the provision of this outwardly turned portion, it is necessary to extend the ends of the drum beyond the main portion of flanges as at 8 in a plane with the outwardly turned portions, in order to provide sufficient bearings for the centering and the driving stud.

From the foregoing it will be apparent that I have provided a film spool which has all the advantages of the usual spool with card board or fiber flanges without the disadvantages of the latter. It is impossible for the flanges to become detached from the drum after the film is wound about the latter and the injuring of the spool holder is prevented.

I claim as my invention.

A film spool for cameras comprising a drum provided with means for attaching a film thereto, bores in its ends, and annular depressions near its ends; and flanges for the drum, each turned outwardly back upon itself to provide a curved edge and having a central sleeve portion fitted on one of the depressed ends so that said end of the drum will project beyond the main portion of the flange and lie in a plane with the outwardly turned portion.

JAMES H. HASTE.

Witnesses:
F. F. CHURCH,
RUSSELL B. GRIFFITH.